(12) United States Patent
Linton et al.

(10) Patent No.: US 11,074,486 B2
(45) Date of Patent: Jul. 27, 2021

(54) QUERY ANALYSIS USING DEEP NEURAL NET CLASSIFICATION

(71) Applicant: International Business Machines Corporation, Armonk, NY (US)

(72) Inventors: Jeb R. Linton, Manassas, VA (US); David K. Wright, Riverview, MI (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 15/822,995

(22) Filed: Nov. 27, 2017

(65) Prior Publication Data

US 2019/0164022 A1 May 30, 2019

(51) Int. Cl.
*G06F 16/00* (2019.01)
*G06K 9/68* (2006.01)
(Continued)

(52) U.S. Cl.
CPC ....... *G06K 9/6892* (2013.01); *G06F 16/2457* (2019.01); *G06F 16/3329* (2019.01); *G06F 16/35* (2019.01); *G06N 3/02* (2013.01)

(58) Field of Classification Search
CPC .......... G06F 16/3329; G06F 16/90328; G06F 16/24522; G06F 16/2455; G06F 16/2457; G06F 16/24578; G06F 16/2468; G06F 16/248; G06F 16/3322; G06F 16/3334; G06F 16/3344; G06F 16/335; G06F 16/532; G06F 16/583; G06F 16/2458
See application file for complete search history.

(56) References Cited

U.S. PATENT DOCUMENTS

| 9,348,877 B2 | 5/2016 | Ramani et al. |
| 2011/0106656 A1 | 5/2011 | Schieffelin |

(Continued)

FOREIGN PATENT DOCUMENTS

| CN | 103116766 A | 5/2013 |
| CN | 104268628 A | 1/2015 |

OTHER PUBLICATIONS

Zhou, Jie, et al. "Graph neural networks: A review of methods and applications." arXiv preprint arXiv: 1812.08434 (2018).*

(Continued)

*Primary Examiner* — Nan Hutton
(74) *Attorney, Agent, or Firm* — Jared C. Chaney (57) ABSTRACT

The present invention provides a method, computer program product, and system of generating predicted reactions of a user. In some embodiments, the method, computer program product, and system include receiving an intelligence data store, receiving a current data object with a current query and at least one knowledge graph, identifying one or more patterns in the at least one knowledge graph, comparing using a deep neural net, the previous queries and associated one or more patterns with the current query and identified one or more patterns of the current data object, classifying the plurality data objects from the intelligence data store based on a closeness of the current query and identified one or more patterns with each of the previous queries and associated one or more patterns in the intelligence data store, and identifying, by the classification engine, potential dispositions based on the classification of the plurality of data objects.

20 Claims, 5 Drawing Sheets

(51) Int. Cl.
G06N 3/02 (2006.01)
G06F 16/35 (2019.01)
G06F 16/2457 (2019.01)
G06F 16/332 (2019.01)

(56) References Cited

U.S. PATENT DOCUMENTS

| | | | |
|---|---|---|---|
| 2018/0150561 A1* | 5/2018 | Wang | G06F 16/248 |
| 2018/0189634 A1* | 7/2018 | Abdelaziz | G06N 5/022 |
| 2018/0253219 A1* | 9/2018 | Dotan-Cohen | G06F 3/04847 |
| 2018/0307912 A1* | 10/2018 | Selinger | G06K 9/78 |
| 2018/0330178 A1* | 11/2018 | el Kaliouby | G06K 9/00228 |
| 2018/0349377 A1* | 12/2018 | Verma | G06N 3/0454 |

OTHER PUBLICATIONS

Wang, Qi, Yongsheng Hao, and Feng Chen. "Deepening the IDA* algorithm for knowledge graph reasoning through neural network architecture." Neurocomputing 429 (2021): 101-109.*

Anonymous, "A Self-Diagnosing Question Answering System," An IP.com Prior Art Database Technical Disclosure, IP.com No. IPCOM000247244D, IP.com Electronic Publication Date: Aug. 17, 2016, 6 pages.

Anonymous, "Query Expansion Based on the Attention Centric Content," An IP.com Prior Art Database Technical Disclosure, IP.com No. IPCOM000246224D, IP.com Electronic Publication Date: May 17, 2016,7 pages.

Baskararaja et al.,"Subgraph Matching Using Graph Neural Network," Scientific Research, Journal of Intelligent Learning Systems and Applications, 2012, 4, pp. 274-278.

Kourtellis et al., "Method and System for Detecting Abusive Users in Community Question Answering Platforms," An IP.com Prior Art Database Technical Disclosure, IP.com No. IPCOM000240232D, IP.com Electronic Publication Date: Jan. 14, 2015, © Yahoo! 2015, 12 pages.

Niepert et al.,"Learning Convolutional Neural Networks for Graphs," https://arxiv.org/pdf/1605.05273.pdf, Proceedings of the 33rd International Conference on Machine Learning, 2016, JMLR: W&CP vol. 48, 10 pages.

Thomas et al., "Review on Graph Clustering and Subgraph Similarity Based Analysis of Neurological Disorders," International Journal of Molecular Sciences, Int. J. Mol. Sci. 2016, 17, 862; doi:10.3390/ijms17060862, 23 pages.

Mell et al., "The NIST Definition of Cloud Computing," Recommendations of the National Institute of Standards and Technology, U.S. Department of Commerce, NIST Special Publication 800-145, Sep. 2011, 7 pages.

* cited by examiner

QUERY ANALYSIS USING DEEP NEURAL NET CLASSIFICATION

BACKGROUND

The present disclosure relates to deep neural net analysis, and more specifically, to query analysis using deep neural net classification.

SUMMARY

The present invention provides a method, computer program product, and system of query analysis using deep neural net classification. In some embodiments, the method and computer program product include receiving an intelligence data store comprising a plurality of data objects comprising previous queries and associated one or more patterns with dispositions associated with the previous queries and associated one or more patterns, receiving a current data object with a current query and at least one knowledge graph, identifying, by a feature identifier, one or more patterns in the at least one knowledge graph, comparing, by a comparison engine, using a deep neural net, the previous queries and associated one or more patterns with the current query and identified one or more patterns of the current data object, classifying, by a classification engine, the plurality data objects from the intelligence data store based on a closeness of the current query and identified one or more patterns with each of the previous queries and associated one or more patterns, and identifying, by the classification engine, potential dispositions based on the classification of the plurality of data objects.

In some embodiments, the system includes at least one processor, an intelligence data store comprising a plurality of data objects comprising previous queries and associated one or more patterns with dispositions associated with the previous queries and associated one or more patterns, a feature identifier configured, in response to receiving a current data object with a current query and at least one knowledge graph, to detect one or more patterns in the at least one knowledge graph, a comparison engine configured to compare, using a deep neural net, the previous queries and associated one or more patterns with the current query and identified one or more patterns of the current data object, a classification engine to score the plurality data objects from the intelligence data store with the current data object based on a closeness of the current query and identified one or more patterns with each of the previous queries and associated one or more patterns, and intelligence classification component configured to identify potential dispositions based on the scores of the plurality of data objects.

BRIEF DESCRIPTION OF THE DRAWINGS

The present description will be better understood from the following detailed description read in light of the accompanying drawings, wherein.

DETAILED DESCRIPTION

In the intelligence and law enforcement communities, gleaning meaningful information from data is often as much of, if not more of, an issue as gathering the data itself. For example, an agency may have the phone records available for a certain area on a certain day, but using traditional methods it would not be possible to sort through the data to link common information or factors of one cell phone to another. It would be useful for intelligence and law enforcement communities to be able to identify activity linked to a criminal or enemy element. For example, making comparisons to see when a group of cell phones were turned off near the same time and place and then turned back on near a second time, could identify members of a clandestine meeting. By linking the phone numbers to other suspicious elements, as well as regular activity, criminal or enemy elements could be identified as well as the activities the criminal or enemy elements have been involved in.

Figure 1:
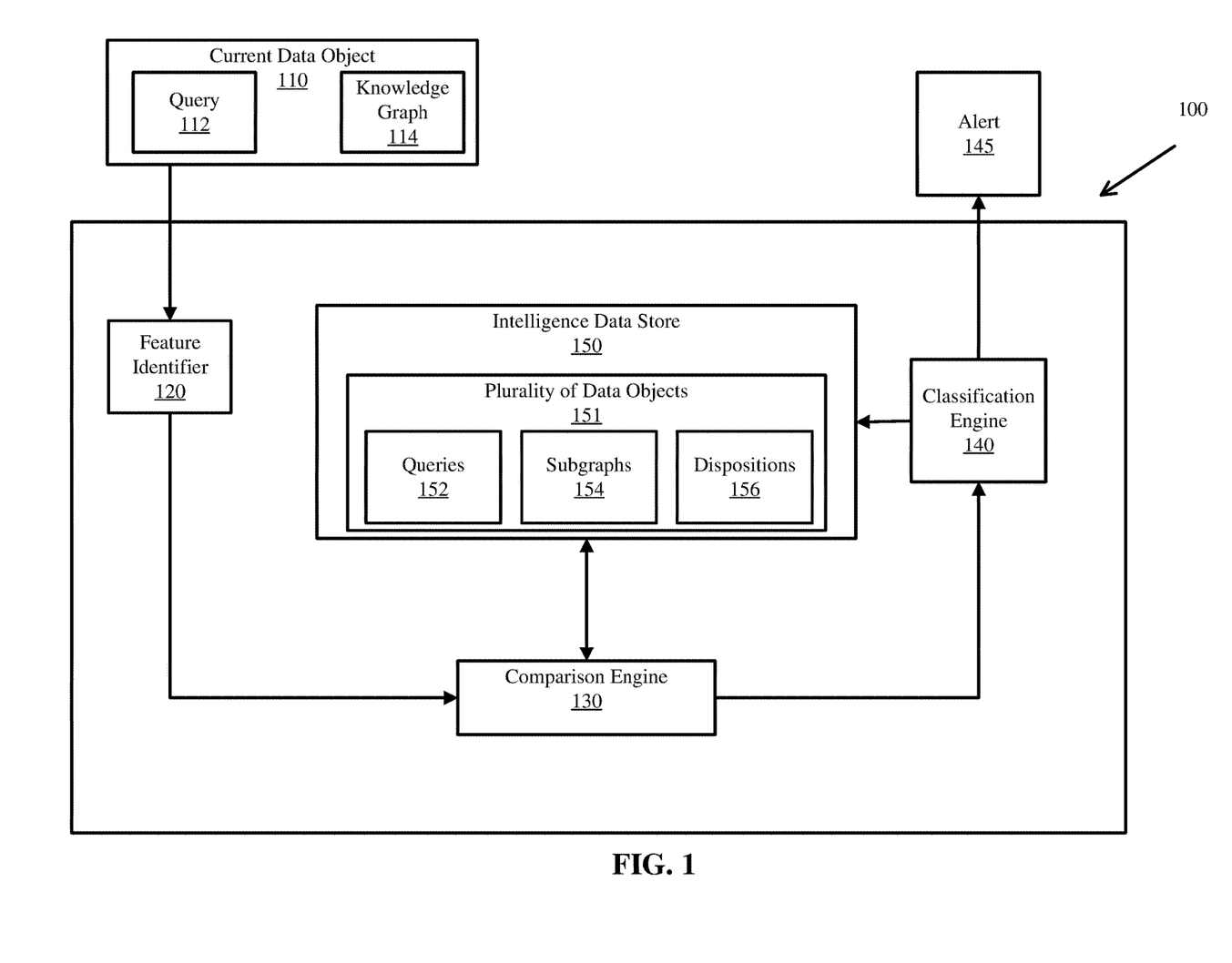
FIG. 1 is as block diagram illustrating components of an intelligence analysis system according to one illustrative embodiment.

FIG. 1 is as block diagram illustrating components of an intelligence analysis system according to one illustrative embodiment. Intelligence analysis system 100 includes a current data object 110 with a Query 112 and knowledge graph 114, a feature identifier 120, a comparison engine 130, a classification engine 140, an intelligence data store 150 with a plurality of data objects 151 and an alert component 145. In some embodiments, the plurality of data objects 151 includes queries 152, subgraphs 154 and dispositions 156. In some embodiments, intelligence data store 150 denotes any government or law enforcement accessible data store. In some embodiments, the data store can be or includes a database, data repositories that include unstructured data, data objects, etc. Intelligence analysis system 100 may determine an entity (e.g., person, corporation, government, or group) is participating in an action that is indicative of enemy or criminal activity, participating in an action that is related enemy or criminal activity, participating in an action that a criminal or enemy element is also participating in, and/or participating in an action that is resulting from enemy or criminal activity (e.g., selling a stolen phone). While the present discussion focuses on the detection of enemy or criminal activity based on previous enemy or criminal activity (contained in intelligence data store 150), the ideas and concepts presented herein are applicable to preventing enemy or criminal activity by considering the property of the data objects on the instance or in response to a user's inputs. In some embodiments, the data object is a file, graph, and/or another collection of data.

Intelligence analysis system 100 receives a current data object 110 that will be scored for potential enemy or criminal activities. In some embodiments, the current data object 110 contains graphical datasets such as a knowledge graph or a system which is functionally analogous to a knowledge graph. The datasets can be merged from multiple sources such as telephone records, law enforcement data stores, intelligence reports, data mining catches, gps readouts, etc. The current data object 110 may relate to a single entity or may relate to a plurality of entities 112 (e.g., individuals, groups, vehicles, locations, or mobile devices). Generally, the more entities current data object 110 is based on the better the results of the intelligence analysis system will be. Current data object 110 may include data objects such as documents, spreadsheets, audio, video, profiles, bios, criminal history files or any other data relevant to enemy or criminal activity. In some embodiments, the current data object 110 includes all of the data objects from each entity accessible by the intelligence analysis system. In other embodiments current data object 110 contains data objects that were determined, through its intelligence analysis program, to be suspicious data objects. A data object in this case may be considered suspicious because it has characteristics of criminal or suspect activity.

In some embodiments, intelligence analysis system 100 receives data objects with data as graphs (such as knowledge graph 114) associated with a query 112. In some embodiments, intelligence analysis system 100 converts data from current data object 110 into one or more graphs (such as knowledge graph 114).

Intelligence analysis system 100 searches, using feature identifier 120, the graphical datasets from the current data object 110 (typically a query paired with data merged from multiple sources such as intelligence reports and telephone call data records) for specific features or one or more subgraphs representative of illicit activities and comparison engine 130 determines connections between the plurality of entities 112 which together with their structured data attributes are suggestive of illicit activity or have a link to a target activity. Comparison engine 130 then compares features identified by feature identifier 120 to one or more data objects from the plurality of data objects 151. For example, comparison engine 130 could perform a graph traversal to connect any mobile phone used at the time and place of an incident to any known suspect, with a shorter distance from the incident being more probable and a larger distance away being less probable. Hops (changes from one cell tower to another) could be used instead of distance.

In some embodiments, feature identifier 120 is a component of the intelligence analysis system 100 that is configured to determine one feature of current data object 110 for comparison. For example, feature identifier could generate at least one subgraph for each graph, such as knowledge graph 114, in the current data object 110. In some embodiments, feature identifier 120 considers each data object that is presented to the intelligence analysis system 100 as well as any related data objects. In some embodiment, the feature identifier 120 takes each data object and generates a subgraph for each feature of the data object. The feature identifier 120 is configured to uses a deep neural network to detect one or more patterns of entities and relations in a knowledge graph (such as knowledge graph 114) which are indicative of enemy or criminal action. Feature identifier 120 normalizes the knowledge graph and the attributes of interest within it into features as input to the deep neural network. In some embodiment, feature identifier 120 includes a subgraph normalization to vector representation.

In some embodiments, feature identifier 120 builds a vector representation for each feature in the data object relevant to a factor (e.g., incident, action, criminal, enemy, crime, etc.). Thus, a vector is built by considering which of the features can be logically connected to each other. For example, feature identifier 120 could identify four or more mobile devices of suspect ownership converging in this specific time-space box and being turned off within an hour of each other, where time and location could each be a feature.

Intelligence analysis system 100 provides a framework for learning representations for features of directed and undirected data or graphs in the current data object 110. The graphs may have nodes and edges with multiple discrete and continuous attributes and may have multiple types of edges. In some embodiments, the Intelligence analysis system 100 uses a method similar to a convolutional neural network for images, comparison engine 130 locally connected neighborhoods from the input graphs. In some embodiments, these neighborhoods are stored in data objects 151 and serve as the receptive examples of a convolutional architecture for enemy or criminal activity, allowing the framework to learn effective graph representations.

The neighborhoods stored in data objects 151, and representative graphs contained within, serve as the receptive fields to read feature values from the pixel nodes. Cognitive neural network techniques, such as Patchy-San, can be used to determine specific ordering for graphs where the node sequences for which neighborhood graphs are created is unknown or the graphs a normalization of neighborhoods graphs (e.g., a unique mapping from a graph representation into a vector space representation).

In some embodiments, classification engine 140 takes the scores that are generated by the comparison engine 130 and determines if a particular data object (queries 152, one or more subgraphs 154, and dispositions 156) has potential for being a positive result to a query. For example, if the queries and one or more patterns (e.g., one or more subgraphs) match closely enough the disposition of the data object from the intelligence data store is likely to be the same as the disposition of the query 112. In some embodiments, the classification engine 140 compares the score of the data object to a threshold score. If the data object exceeds a threshold score, the data object is marked as a possible positive result. In some embodiments a second threshold score may be present as well. The second threshold score is a score representative of a very strong likelihood that the data object contains a positive result. If the data object exceeds the second threshold, the classification engine 140 may cause classification engine 140 to draw key features from the data object and compare those features to other data objects. For example, if classification engine 140 could determine that a first phone number associated with the data object exceeds the second threshold, classification engine 140 could then tag all phone numbers that have called or received calls from the first phone number.

Data objects that fall between the first and second threshold may in some embodiments flagged for investigator to look at in more detail and make a determination that the data object is relevant. In this way the investigator is able to focus on the most relevant results. In additional embodiments the classification engine 140 may label data objects which have a score that falls under a third threshold score, which is lower than the first and second threshold scores, as data objects not pertinent to the query.

Intelligence data store 150 is a data store that houses the features of known queries. In some embodiments, intelligence data store 150 forms a repository for known and related enemy or criminal factors for comparisons. Intelligence analysis system 100 is trained using labeled training data in the form of queries which have been performed in the past, with a user-selected "quality" label indicating which query responses contained information that was or would be considered significant and worthy of an alert. For example, this could take the form of historical logs of activity in an Intelligence or Law Enforcement agency, with automated extraction of the quality label based on whether or not the results were included in a case report.

These known examples could have been processed in a manner similar to the current data object 110, such new examples may be created for use by the comparison engine 130 in score the data objects. As new data objects and queries are discovered or analyzed those data objects and their corresponding features may be added to intelligence data store 150. In some embodiments intelligence data store 150 includes data objects not relevant to associated queries. For example, intelligence data store 150 may have a list of one or more subgraphs that do not indicate a disposition for a given query.

In some embodiments, intelligence analysis system 100 uses a deep belief network with two or more hidden layers in order to maximize the value of limited labeled training data to train on each isomorphism.

Figure 2:
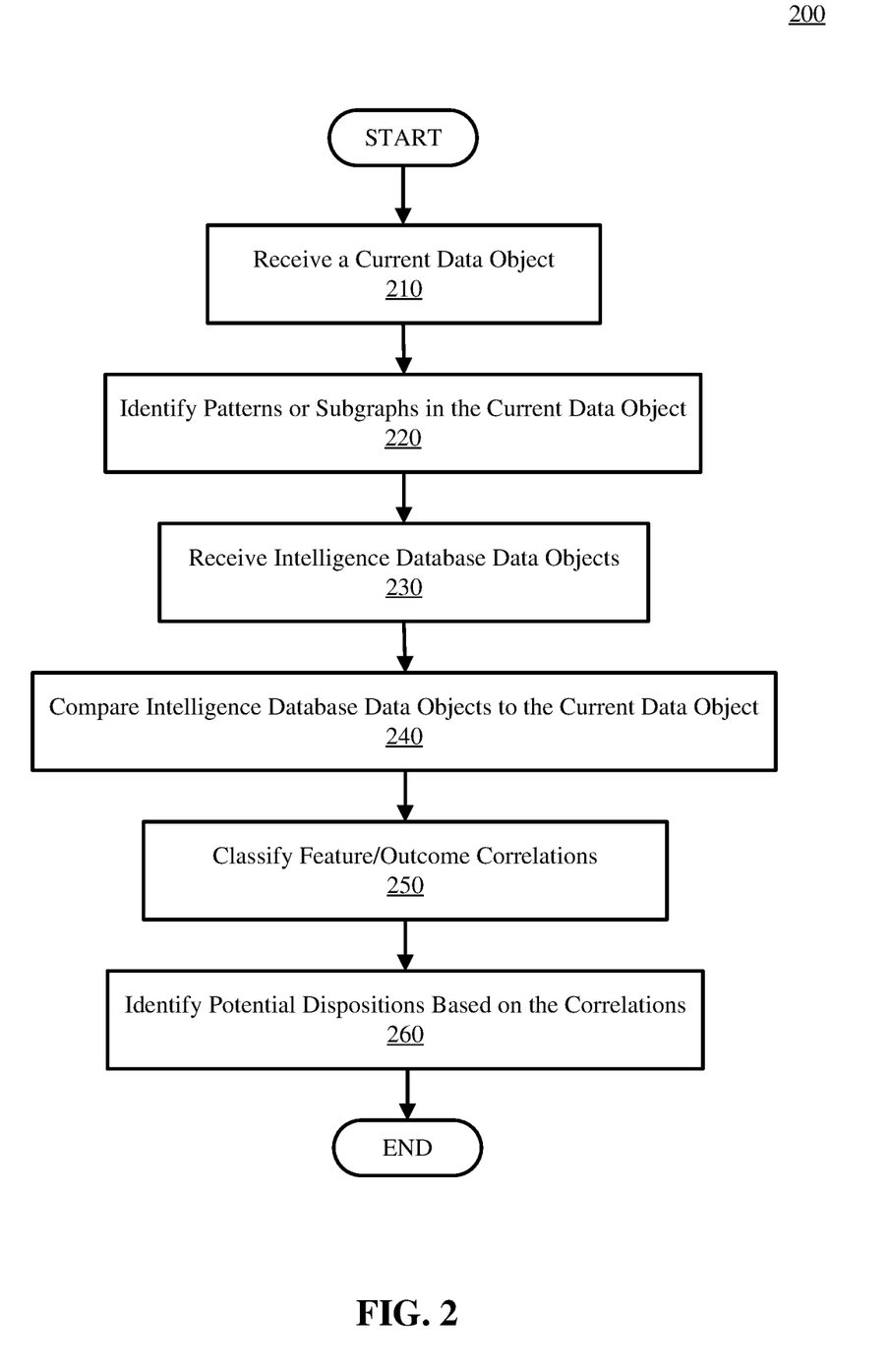
FIG. 2 is a flow diagram illustrating a process for an intelligence analysis system according to one illustrative embodiment.

FIG. 2 is a flow diagram illustrating a process for enhanced law enforcement and/or intelligence analysis using deep neural network based graph isomorphism classifications according to one illustrative embodiment of the present disclosure. While this discussion is focused on law enforcement and/or intelligence data stores the same process could be used in law enforcement and/or intelligence analysis. Process 300 begins with the receipt of a current data object 110 on a query 112 with at least one knowledge graph 114. This is illustrated at step 310. The current data object 110 may include all data relating to query 112, or it could contain links or sources for data relating to query 112. The current data object 110 may include data such as documents, spreadsheets, audio, video, social media feeds, phone records, or any other source of data that has information relevant to query 112.

Feature identifier 120 uses one or more algorithms to extract one or more patterns or one or more subgraphs on the data (such as knowledge graph 114) contained in current data object 110. In some embodiments, the identification uses known one or more patterns or one or more subgraphs, such as those contained in intelligence data store 150, as a comparison to identify the one or more patterns or one or more subgraphs from current data object 110. For example, feature identifier 120 could identify any subgraph representing four or more mobile devices of suspect ownership converging in this specific time-space box and being turned off within an hour of each other since that factor has been found to be indicative of a query before. In some embodiments, feature identifier 120 is able to identify one or more patterns or one or more subgraphs relating to queries without baseline one or more patterns or one or more subgraphs for comparison. For example, feature identifier 120 could use a historical query that identified identify a subgraph representing four or more mobile devices of suspect ownership converging in this specific time-space box and being turned off within an hour of each other and search the current data object for any subgraph representing four or more mobile devices of suspect ownership converging in this specific time-space box and being turned off within an hour of each other.

In some embodiments, the identifier is trained, via machine learning, with the historical examples contained in intelligence data store 150. In some embodiments, the historical examples include previous identification of intelligence analysis system 100. In some embodiments, the historical examples are drawn from other sources. For example, the historical examples could be solved cases with proven dispositions, where the feature identifier has processed the data object after the fact to find one or more patterns or one or more subgraphs in the data. The identifying one or more patterns or one or more subgraphs in the current data object is illustrated in step 220.

At step 230, the system receives intelligence data store data objects. A plurality of data objects 151 could be received before step 220 if the data objects are used for pattern identification, and/or it could be received after step 220 for use in comparison engine 130.

After the system receives the plurality of data objects 151, using comparison engine 130 step 240 compares identified features (such as one or more patterns or one or more subgraphs) in current data object 110 with features from the plurality of data objects 151 in intelligence data store 150. The system does this for all permutations of features identified by feature identifier 120. In some embodiments, the system or network is trained using labeled training data in the form of queries which have been performed in the past, with a user-selected "quality" label indicating which query responses contained information that was or would be considered significant and worthy of an alert. This could take the form of historical logs of activity in an Intelligence or Law Enforcement agency, with automated extraction of the quality label based on whether or not the results were included in a case report.

In some embodiments, classification engine 140 determining a score or correlation value for each of the data objects in the current data object 110. This is illustrated at step 250 of classifying feature/outcome correlations. At step 250 the system can employ several different approaches for scoring a data object. In one embodiment the system identifies one or more individual data objects from intelligence data store 150 that are most similar to the data object 110. Next the system calculates a score or classification value based on the correlation of the one or more patterns or one or more subgraphs of the current data object to the one or more patterns or one or more subgraphs in the one or more individual data objects from the intelligence data store 150. The weighted list may add a value to the score for a known correlation, subtract a score for known dispositive correlations, and zero out scores for data objects not falling into either category. Additionally, the weighted score may be based on a determined ranking of the data objects based on the number of pattern or subgraph correlations to current data object 110.

At step 260, the system identifies potential dispositions (e.g., answers) for query 112. In some embodiments, once the score has been calculated for the data objects at step 250, the potential dispositions are identified or ranked by the scores of the data objects they are associated with and provided to alert component 145. This is illustrated at step 260. The alert component may notify a user of the one or more ranked data objects at step 260. It may identify the dispositions of each the data objects based on the threshold scores discussed above. For example, if the data object score meets or exceeds the higher threshold score, the disposition will be marked as conclusive. If it exceeds the lower threshold it may be marked as needing further evaluation. If the data object is below both thresholds it may be marked as not a possible disposition. In some embodiments, the system may also add the current data object with the conclusive disposition to intelligence data store 150 for future use.

Computer System

Figure 3:
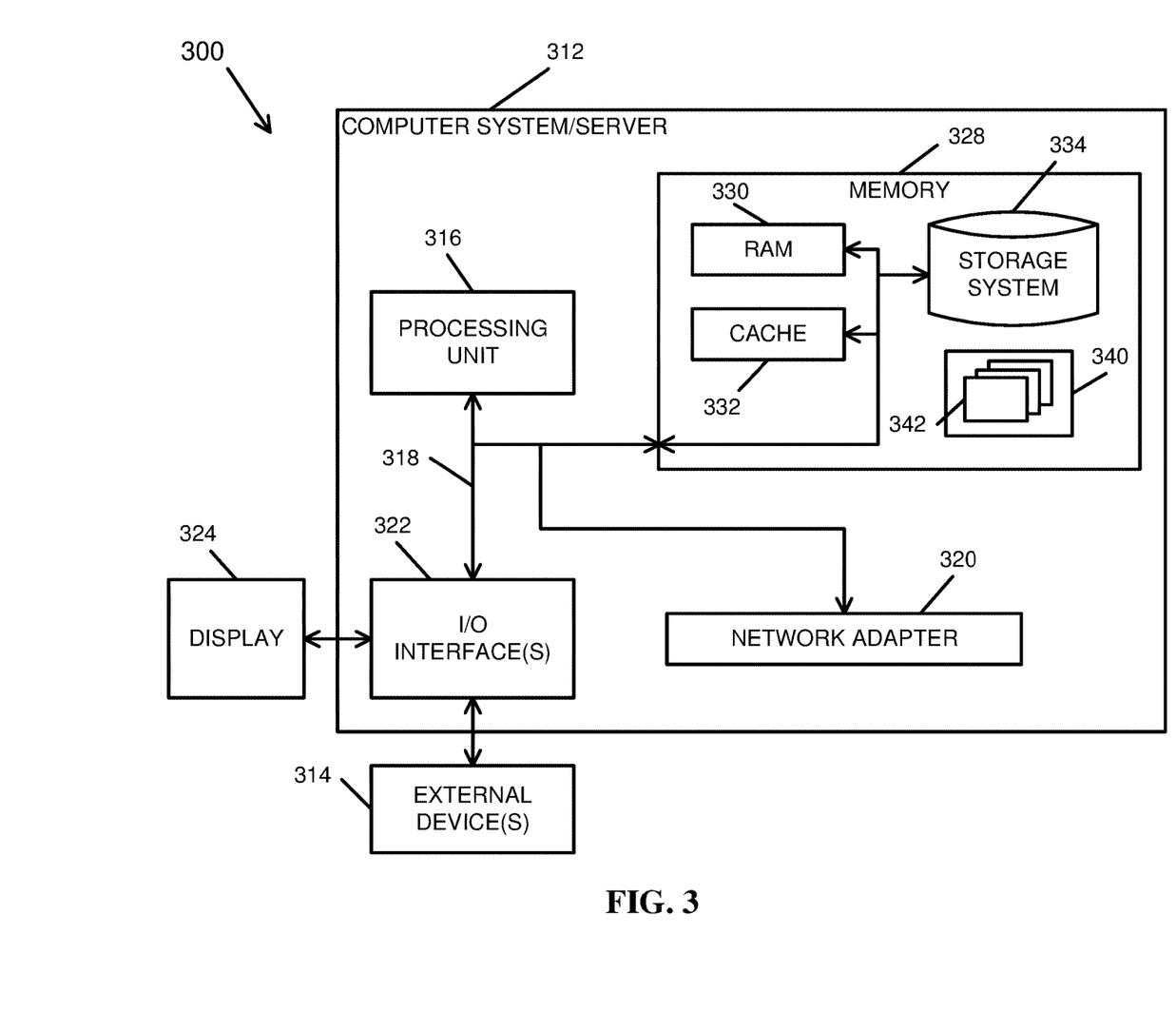
FIG. 3 depicts a computer system in accordance with an exemplary embodiment of the present invention.

In an exemplary embodiment, the computer system is a computer system 900 as shown in FIG. 3. Computer system 300 is only one example of a computer system and is not intended to suggest any limitation as to the scope of use or functionality of embodiments of the present invention. Regardless, computer system 300 is capable of being implemented to perform and/or performing any of the functionality/steps of the present invention.

Computer system 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 312 may be described in the general context of computer system-executable instructions, such as program modules, being executed by a computer system. Generally, program modules may include routines, programs, objects, components, logic, and/or data structures that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 3, computer system/server 312 in computer system 300 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions/steps of embodiments of the invention.

Program/utility 340, having a set (at least one) of program modules 342, may be stored in memory 328 by way of example, and not limitation. Exemplary program modules 342 may include an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the present invention.

Computer system/server 312 may also communicate with one or more external devices 314 such as a keyboard, a pointing device, a display 324, one or more devices that enable a user to interact with computer system/server 312, and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
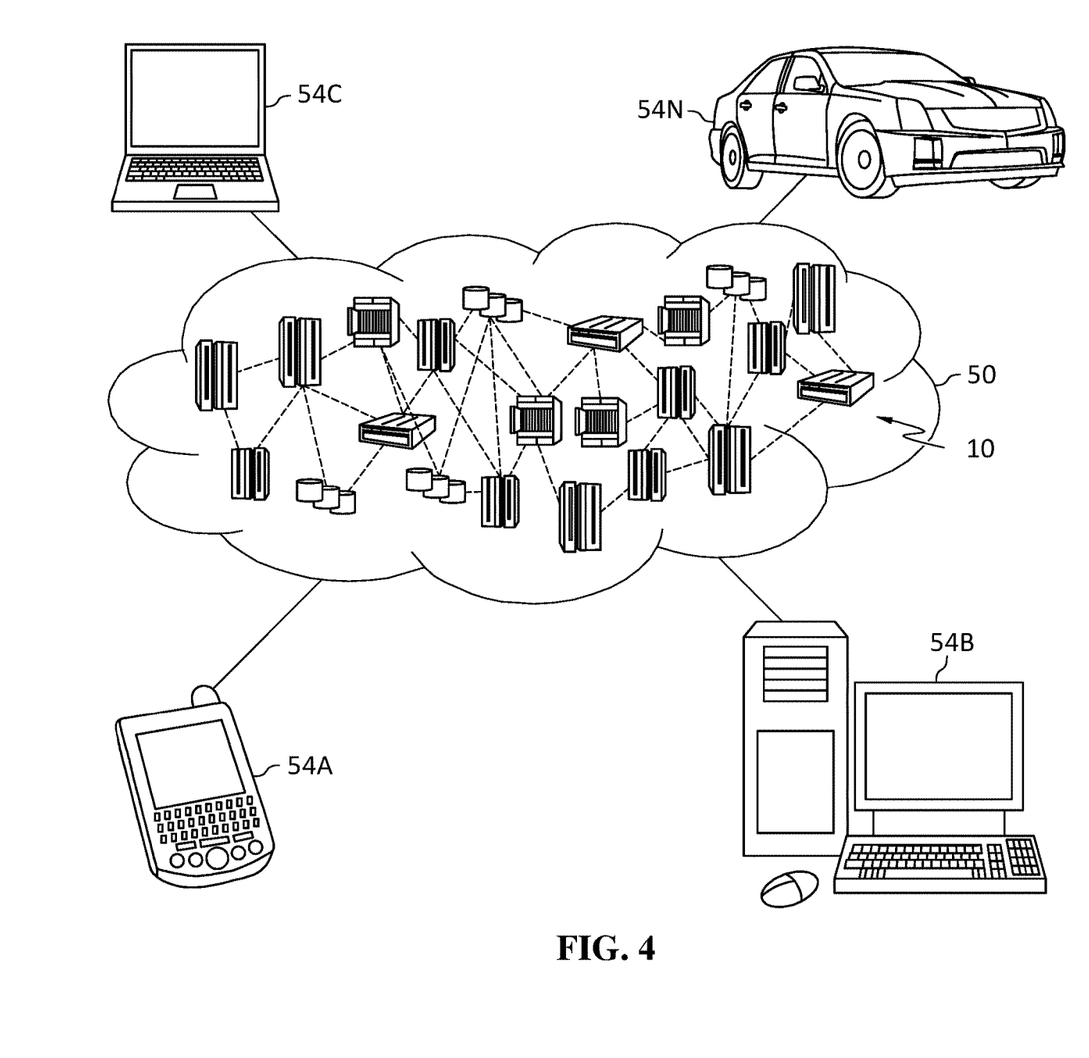
FIG. 4 depicts a cloud computing environment according to various embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
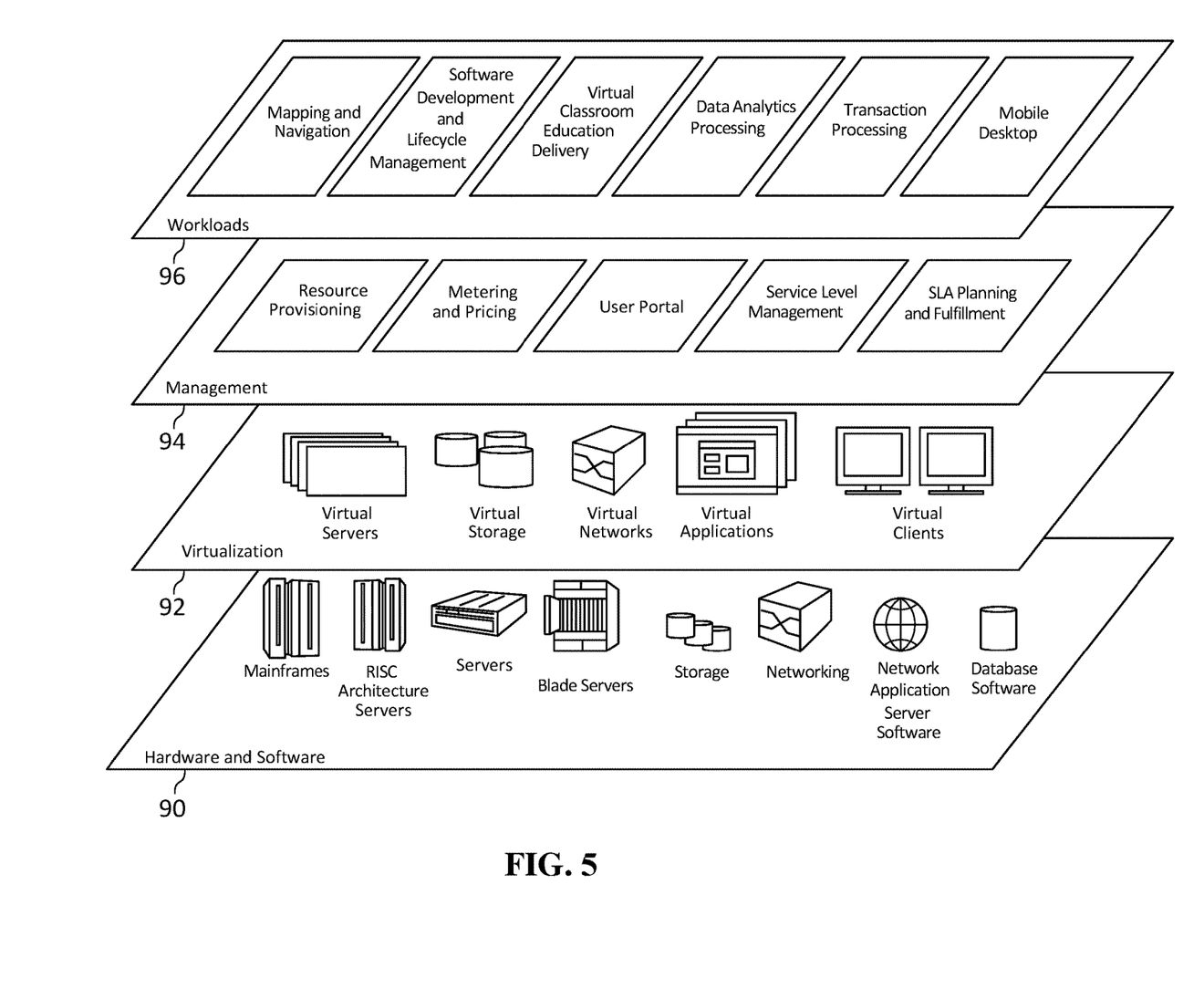
FIG. 5 depicts abstraction model layers according to various embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 90 includes hardware and software components. Examples of hardware components include: mainframes; RISC (Reduced Instruction Set Computer) architecture based servers; storage devices; networks and networking components. In some embodiments, software components include network application server software.

Virtualization layer 92 provides an abstraction layer from which the following examples of virtual entities may be provided: virtual servers; virtual storage; virtual networks, including virtual private networks; virtual applications and operating systems; and virtual clients.

In one example, management layer 94 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

The invention claimed is:

1. A system comprising:
    at least one processor;
    an intelligence data store comprising a plurality of data objects comprising previous queries and associated one or more patterns with dispositions associated with the previous queries and associated one or more patterns;
    a feature identifier configured, in response to receiving a current data object with a current query and at least one knowledge graph, to detect one or more patterns of entities and relations in the at least one knowledge graph,
        wherein the current data object is related to a mobile phone;
    a comparison engine configured to compare, using a deep neural net, the previous queries and associated one or more patterns with the current query and identified one or more patterns of the current data object,
        wherein the comparing includes performing a graph traversal to identify a distance of the mobile phone from an incident;
    a classification engine to score the plurality data objects from the intelligence data store with the current data object based on a closeness of the current query and identified one or more patterns with each of the previous queries and associated one or more patterns; and
    an intelligence classification component configured to identify that the mobile phone was used at the time and place of an incident based on the scores of the plurality of data objects.

2. The system of claim 1, wherein the patterns are one or more subgraphs and the classification engine is a neural net sub-graph classification engine.

3. The system of claim 2, wherein the classification engine includes a feature layer which normalizes attributes of interest as features in a deep net.

4. The system of claim 3, wherein the feature layer includes a vector representation and focusing algorithms.

5. The system of claim 3, wherein the classification engine includes a 3+ layer multilayer perception (MLP).

6. The system of claim 3, wherein the classification engine includes a convolutional neural net architecture to perform focus-shifting analysis of an overall graph.

7. The system of claim 3, wherein the queries are from law enforcement.

8. The system of claim 3, wherein the queries are from an intelligence agency.

9. The system of claim 3, wherein the feature layer includes a subgraph normalization to vector representation.

10. The system of claim 1, wherein the one or more patterns are classified with labels.

11. The system of claim 1 further comprising, a reporting engine, configured to report that the mobile phone was used at the time and place of an incident via a display logically connected to the system.

12. The method of claim 1, wherein the comparing further includes performing graph traversal measures hops in the vicinity of the incident.

13. A method for answering a query comprising:
    receiving an intelligence data store comprising a plurality of data objects comprising previous queries and associated one or more patterns with dispositions associated with the previous queries and associated one or more patterns;
    receiving a current data object with a current query and at least one knowledge graph;
    identifying, by a feature identifier, one or more patterns of entities and relations in the at least one knowledge graph,
    wherein the current data object is related to a mobile phone;
    comparing, by a comparison engine, using a deep neural net, the previous queries and associated one or more patterns with the current query and identified one or more patterns of the current data object,
    wherein the comparing includes performing a graph traversal to identify a distance of the mobile phone from an incident;
    classifying, by a classification engine, the plurality data objects from the intelligence data store based on a closeness of the current query and identified one or more patterns with each of the previous queries and associated one or more patterns; and
    identifying, by the classification engine, that the mobile phone was used at the time and place of an incident based on the classification of the plurality of data objects.

14. The method of claim 13, wherein the patterns are one or more subgraphs and the classification engine is a neural net sub-graph classification engine.

15. The method of claim 13, wherein the classification engine includes a feature layer which normalizes attributes of interest as features in a deep net.

16. The method of claim 15, wherein the feature layer includes a vector representation and focusing algorithms.

17. The method of claim 15, wherein the classification engine includes a 3+ layer multilayer perception (MLP).

18. The method of claim 15, wherein the classification engine includes a convolutional neural net architecture to perform focus-shifting analysis of an overall graph.

19. The method of claim 15, wherein the queries are from law enforcement.

20. A computer program product comprising a computer readable storage medium having program instructions embodied therewith, the program instructions executable by a processor to cause the processor to perform a method comprising:
    receiving an intelligence data store comprising a plurality of data objects comprising previous queries and associated one or more patterns with dispositions associated with the previous queries and associated one or more patterns;

receiving a current data object with a current query and at least one knowledge graph;

identifying, by a feature identifier, one or more patterns of entities and relations in the at least one knowledge graph, wherein the current data object is related to a mobile phone;

comparing, by a comparison engine, using a deep neural net, the previous queries and associated one or more patterns with the current query and identified one or more patterns of the current data object, wherein the comparing includes performing a graph traversal to identify a distance of the mobile phone from an incident;

classifying, by a classification engine, the plurality data objects from the intelligence data store based on a closeness of the current query and identified one or more patterns with each of the previous queries and associated one or more patterns; and identifying, by the classification engine, that the mobile phone was used at the time and place of an incident based on the classification of the plurality of data objects.

\* \* \* \* \*